Figure 1:
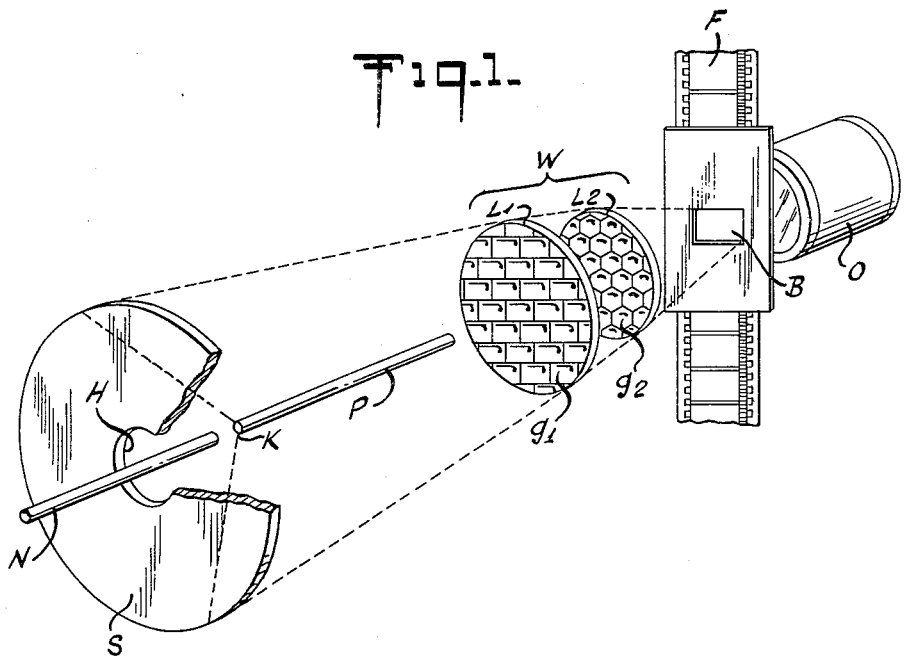

July 11, 1961    H. SCHERING    2,991,691
LIGHT CONDENSER
Filed Aug. 14, 1957

INVENTOR
Helmuth Schering
BY
ATTORNEYS

United States Patent Office 2,991,691
Patented July 11, 1961

2,991,691
LIGHT CONDENSER
Helmuth Schering, Dresden, Germany, assignor to VEB Kamera- und Kinowerke Dresden
Filed Aug. 14, 1957, Ser. No. 678,126
Claims priority, application Germany Sept. 3, 1956
2 Claims. (Cl. 88—24)

This invention relates to a light condenser designed to be arranged in the path of a light beam emanating from a projector light source, for example a mirror- or reflector-type motion picture projector lamp, and in particular to a so-called honeycomb condenser which consists of a plurality of raster plates or lens plates.

In general, such a honeycomb condenser comprises two lens plates, each of which is plane on one side and provided with a raster or grating of a plurality of small lenses on the other side. The two lens plates are normally disposed coaxially with respect to one another between the light source reflector and the film aperture or picture window past which the motion picture film travels, the lens rasters facing each other. The individual lenses on the raster plate nearest the reflector are of substantially rectangular configuration, thus conforming in shape to the shape of the picture window, while the individual lenses on the raster plate nearest the picture window are of substantially hexagonal configuration, thus conforming in shape to the shape of the crater in the positive arc-lamp carbon employed as the actual light source. The above described condenser is known as a honeycomb condenser, due to the honey-comb-like appearance of the aforesaid raster of hexagonal lenses on the second lens or raster plate. Each of the individual lenses of the first raster plate (as seen from the concave mirror or like reflector) has such a focal length that it forms an image of the light source, i.e., of the crater in the positive carbon, in the corresponding lens of the second raster plate (as seen from the reflector). At the same time, the individual lenses of the second plate have respective focal lengths of such magnitude that coinciding or superimposed images of the lenses of the first plate are projected onto the picture window. For ease of identification, the first plate may be referred to as the image field raster, while the second plate may be referred to as the radiant field raster.

In such a system, of course, it is clear that the rays of light traveling from the centers of the image field raster lenses to the centers of the radiant field raster lenses must ultimately intersect one another precisely in the center of the picture window in order to ensure exact superimposition or coincidence of the various images of the image field raster lenses. Furthermore, for a given focal length of the lenses it is essential that a predetermined distance be maintained between the raster plates to enable the above-described dual image formation to be effected. In fact, it has been found that each honeycomb condenser having a specific arrangement, size and focal length of the individual raster lenses becomes restricted to being used at a single specified distance from the picture window, with a single particular picture window format and with a bundle of light rays having a single specified diameter.

For standard picture projection processes, it has heretofore been customary to adapt the honeycomb condenser to a picture window having a size of 15.2 x 20.9 mm. and to a ratio of the lens aperture of about 1:1.9. The distance between the two raster plates and the sizes of the two plates in such a honeycomb condenser are so chosen that the course of the light rays from the centers of the image field raster lenses to the centers of the associated radiant field raster lenses is equivalent to a cone of light emanating from a conventional reflector-type lamp having a mirror diameter of 300 or 350 mm. Moreover, at the radiant field raster plate there is provided a convex lens surface by means of which the maximum lens aperture ratio is brought to 1:1.9 and adapted to conventional objective apertures.

The introduction of the so-called wide screen projection processes has now made necessary a change in the construction of the honeycomb condenser. In one of these known wide screen processes (Cinemascope), the picture window size has been increased to 18.16 x 23.16 mm. In order to attain larger light beams for illuminating the wider picture screens, efforts have been made to employ higher ratios of the lens aperture, for example 1:1.6. An adequate illumination of the larger picture windows and the larger lens aperture ratios is, however, no longer possible with the heretofore known honeycomb condenser.

It is, therefore, an important object of the present invention to provide a honeycomb condenser adapted to use with a variety of motion picture projection processes.

Another object of the invention is to enable such a condenser to be incorporated in any projection system regardless of the lens aperture ratio and/or reflector size employed, without necessitating any changes in the characteristics of the lenses of the raster plates, whereby the cost of manufacture of the condenser is held to a minimum due to the fact that all the uniformly shaped raster plates can be produced by means of a single die or pressing tool.

Still another object of the present invention is to provide a honeycomb condenser or honeycomb condenser consisting of two grating-type raster plates which are uniquely constructed to render the condenser susceptible to a wide range of uses.

More particularly, according to the present invention there is provided a novel and improved honeycomb condenser to be located in the light projection path of a motion picture reflector lamp, which condenser includes (1) a radiant field raster on the ungrated side of which (facing away from the lamp and toward the picture window) is formed a lens portion having a focal length so predetermined that the condenser is adapted to a specified picture window format, and (2) an image field raster on the ungrated side of which (facing the lamp and away from the picture window) there is provided a lens portion having a focal length so selected that the condenser is additionally adapted to a predetermined lens aperture ratio, a predetermined reflector size, and a predetermined spacing of the reflector from the picture window.

In this manner it is possible, first, to adapt a honeycomb condenser with a given grating structure, i.e., distribution of its individual lenses, to any particular picture window size by providing two simple convex lens portions or surfaces on the ungrated sides of the raster plates, second, to illuminate evenly any predetermined lens aperture ratio, and, third, to insert the condenser in the beam path of any particular type of reflector lamp. It is also readily possible to maintain in readiness two different condensers, e.g. one for standard screen projection and one for wide screen projection, and to interchange these condensers as circumstances require. All of such condensers are characterized by the same grating structure, by the same distance between the raster plates, and thus also by the same overall constructional arrangement. The adaptability of such condensers, furthermore, is so great that plates of like grating characteristics can be employed for standard film and for narrow or sub-standard films. For a narrow film projection it will only be necessary to select raster plates of smaller diameter.

As intimated hereinabove, one of the considerable advantages accruing from the implementation of the principles of the present invention is that one and the same very expensive die or pressing tool may be used in the construction of the raster plates, which leads to substantial economies in the production of honeycomb condensers of the aforesaid type since the almost prohibitive cost of manufacturing a plurality of dies is avoided.

Figure 2:
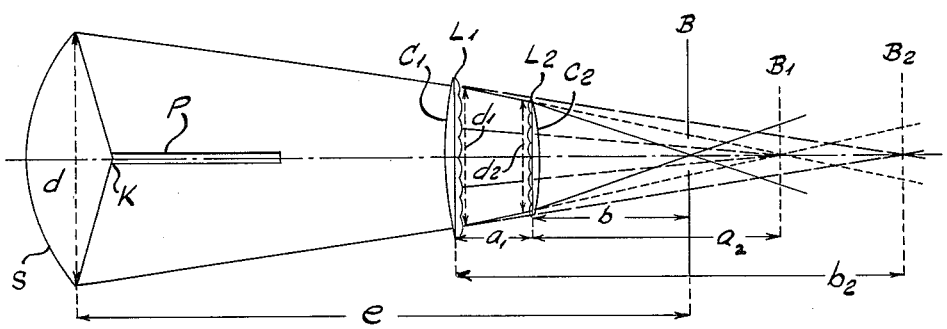

The above and other objects and advantages of the instant invention will become more readily apparent from the following detailed description when taken in conjunction with the accompanying drawings, in which:

FIG. 1 is a perspective view of a motion picture projection system including a honeycomb condenser according to the present invention, a part of the reflector being broken away to show the carbon arrangement; and FIG. 2 is a diagrammatic view of the aforesaid system, illustrating the spatial relationships between the various elements.

Referring now more particularly to the drawings, it will be seen that the projection system essentially includes a concave mirror or reflector S provided with a central hole H through which extends a negative carbon electrode N axially aligned and coacting with a positive carbon electrode P having a crater K which constitutes the actual source of light, a honeycomb condenser W, a picture window B and an objective O. The condenser W according to the present invention consists of an image field raster plate $L_1$ and a radiant field raster plate $L_2$. The first raster plate is provided on one side with a grating or raster of substantially rectangular lenses $g_1$ and with a convex lens portion $C_1$ on the other, the lens portion $C_1$ facing the reflector S. Correspondingly, the second raster plate $L_2$ is provided on one side with a honeycomb-like raster or grating of substantially hexagonal lenses $g_2$ and on the other side with a convex lens portion $C_2$, the lens portion $C_2$ facing away from the reflector.

The dimensional characteristics and spatial relationships of the condenser plates and the remainder of the projection system which are required to satisfy the desired operating conditions may be derived as follows:

The image field raster plate $L_1$ is arranged a distance $a_1$ from the radiant field raster plate $L_2$ which in turn is spaced a distance $b$ from the picture window B. The distance from the radiant field raster plate $L_2$ to the convergence point $B_1$ of the light rays emanating from the centers of the individual lenses $g_2$ of said radiant field raster plate is $a_2$, while the distance from the image field raster plate $L_1$ to the convergence point $B_2$ at which the light rays emanating from the centers of the individual lenses $g_1$ of said image field raster plate would meet in the absence of the plate $L_2$ is $b_2$. The diameter of the reflector S at its widest boundary is $d$, and the distance from this boundary to the picture window B is $e$. The diameter of the light cone emitted from the arc lamp carbon crater K and reflected by the concave mirror S is $d_1$ at the plate $L_1$, while the diameter of the light cone at the plate $L_2$ is $d_2$.

From conventional optical theory it will be seen that when the raster plates are assumed to be plane, the magnification effected by the radiant field raster lenses in forming the coinciding images of the image field raster lenses in the plane of the convergence point $B_1$ is $$V_0 = \frac{a_2}{a_1}$$

The first requirement for the condenser is now to adapt the magnification to the picture window format. This magnification is designated V. The distance of the picture window B from the radiant field raster is, thus, $$b = a_1 \cdot V$$

and the focal length of the lens portion $C_2$ of the radiant field raster plate $L_2$ is $$f_{L_2} = \frac{a_2 \cdot b}{a_2 - b}$$

For example, let it be assumed that $a_1 = 65$ mm., $a_2 = 180$ mm., and the size of the individual lens $g_1$ is 8.5 x 11 mm. For a wide screen projection arrangement, the size of the picture window is 18.16 x 23.16 mm. and it is necessary to project onto the picture window a light spot 20.2 x 25.2 mm. in size. The required magnification V, therefore, is approximately 2.4.

For a standard film projection, the picture window size is 15.2 x 20.4 mm. and a light spot of 17.5 x 23.0 mm. must be projected on such picture window. The required magnification V is now approximately 2.1.

The distance b between the picture window B and the radiant field raster thus is 156 mm. in the case of a wide screen projection and 136 mm. in the case of a standard film projection.

The focal length $f_{L_2}$ of the convex lens portion of the radiant field raster plate then becomes 1,170 mm. in the case of the wide screen projection and 555 mm. in the case of the standard film projection.

The second requirement for the honeycomb condenser is now that for a predetermined concave mirror or reflector size and a predetermined distance $e$ between the reflector and the picture window B, a predetermined lens aperture ratio, for example 1:1.9 or 1:1.6, is illuminated, in conjunction with which the correct course of the light rays through the centers of the raster lenses of the condenser must, of course, be maintained.

If it is required, for instance, to illuminate a lens aperture ratio of $1:x$, the diameter of the light cone at $L_2$ must be $$d_2 = \frac{b}{x} = \frac{a_1 \cdot V}{x}$$

In the honeycomb condenser, the course of the light rays must be such that the connecting lines of the raster lens centers intersect at a point in the plane $B_1$ spaced a distance $a_2$ from $L_2$.

From the foregoing it follows that the diameter of the light cone at $L_1$ is $$d_1 = \frac{a_1 + a_2}{a_2} \cdot d_2 = \frac{a_1 + a_2}{a_2} \cdot \frac{a_1 \cdot V}{x}$$

If the light cone coming from the concave mirror S has a diameter $d_1$ at the first raster plate $L_1$, then in the absence of the second raster plate $L_2$ the light rays emitted from the arc lamp carbon crater K would intersect one another in the plane $B_2$ on the optical axis of the projection system. The lens portion $C_1$ on the raster plate $L_1$ must, therefore, refract the light rays to such an extent that they intersect one another in the plane $B_1$, whereby the main rays of the individual bundles of rays leaving the raster lenses $g_1$ are brought into coincidence with the imaginary connecting lines extending from the centers of the raster lenses $g_1$ to the centers of the corresponding raster lenses $g_2$.

It will, of course, be understood that the distances $a_1$ and $a_2$ are determined by and as functions of the focal lengths of the raster lenses $g_1$ and $g_2$, or vice versa. These focal lengths may, thus, be found from the relations $$f_{R_1} = \frac{a_1(a_2 + a_1)}{a_2}$$

and $$f_{R_2} = \frac{a_1 \cdot a_2}{a_1 + a_2}$$

For the illustrated arrangement, it is possible to derive the relation $$b_2 = \frac{[e - a_1(V+1)] \cdot d_1}{d - d_1}$$

from which the focal length of the lens portion $C_1$ of $L_1$ is found to be $$f_{L_1} = \frac{(a_1+a_2) \cdot b_2}{b_2-(a_1+a_2)}$$

To illustrate the implementation of the present invention, it may be assumed that, as before, $a_1=65$ mm. and $a_2=180$ mm., whereby $V=2.4$ in the case of a wide screen projection, while in the case of a standard screen projection $V=2.1$. Concurrently, the reflector diameter $d=350$ mm., while the distance between the rim of the mirror and the picture window B is $e=852$ mm.

A lens aperture ratio of 1:1.9 then gives the following values for $d_1$, $b_2$ and $f_{L_1}$:

Wide screen projection:
 $d_1=112$ mm.
 $b_2=297$ mm.
 $f_{L_1}=1,400$ mm.

Standard screen projection:
 $d_1=97.5$ mm.
 $b_2=252$ mm.
 $f_{L_1}=8,850$ mm.

A lens aperture ratio of 1:1.6 gives the following values:

Wide screen projection:
 $d_1=133$ mm.
 $b_2=387$ mm.
 $f_{L_1}=667$ mm.

Standard screen projection:
 $d_1=116$ mm.
 $b_2=322$ mm.
 $f_{L_1}=1,015$ mm.

It will, of course, be understood that a number of changes may be made in the honeycomb condenser and its spatial arrangement relative to the remainder of the projection system without departing in any manner from the spirit of the present invention and the scope of the appended claims, and it is not intended to limit this invention to the specific form herein disclosed except as set forth in the claims.

I claim:
1. An illuminating system for a motion picture projector, said system comprising a first raster plate consisting of a honeycomb lens having a planar surface on one side and a raster of rectangular convex lenses on the other side; a second raster plate consisting of a honeycomb lens having a planar surface on one side and a raster of hexagonal convex lenses on the other side, the two raster plates being fixedly spaced and co-axially disposed with the raster lenses facing each other, both raster plates having the same number of raster lens elements relatively similarly distributed, and the second raster plate being of smaller diameter than the first, the two raster plates defining essentially a truncated base portion of a virtual cone, said cone constituting the confining locus of virtual direction lines from the first raster to and through the second raster to the apex of the virtual cone as the focal point of such lines; a source of light co-axially spaced from the first raster plate and a co-axial reflector directing a light beam from said source toward said first raster plate; and means including first condensing lens means cooperative with said light beam and reflector to direct and condense the light beam into said first raster plate to cause the rays of the light beam to travel between the two raster plates in directional lines congruent with the virtual direction lines of the virtual cone defined by the two rasters, whereby the physical optical lines and the controlled light rays are congruent and directed in regular lines free from confusion; a picture window spaced co-axially behind the second raster plate; and second condensing lens means disposed behind said second raster plate for focusing the light beam transmitted through the second raster plate to a point in the plane of said picture window.

2. An illuminating system, as in claim 1, in which the two raster plates are of a standardized set with fixed dimensions and spacing; and the two condensing lenses are of appropriate respective focal lengths to accommodate the raster plate unit assembly to the dimension and spacing of the illuminating image of the reflector on one hand, and to accommodate the raster plate unit assembly to the dimension and spacing of the picture window on the other hand.

References Cited in the file of this patent
UNITED STATES PATENTS

| | | |
|---|---|---|
| 1,333,304 | Gage et al. | Mar. 9, 1920 |
| 1,762,932 | Mihalyi | June 10, 1930 |
| 2,183,249 | Schering et al. | Dec. 12, 1939 |
| 2,186,123 | Rantsch et al. | Jan. 9, 1940 |
| 2,195,184 | Mobary | Mar. 26, 1940 |
| 2,202,061 | Mobary et al. | May 28, 1940 |
| 2,270,517 | Drucker | Jan. 20, 1942 |
| 2,326,970 | Rantsch | Aug. 17, 1943 |
| 2,803,163 | Ulfers | Aug. 20, 1957 |

FOREIGN PATENTS

| | | |
|---|---|---|
| 741,246 | Great Britain | Nov. 30, 1955 |